(12) United States Patent
Shi et al.

(10) Patent No.: US 9,851,252 B2
(45) Date of Patent: Dec. 26, 2017

(54) COMPRESSIVE SENSING-BASED MULTISPECTRAL VIDEO IMAGER WITH DOUBLE CHANNELS AND IMAGING METHOD

(71) Applicant: XIDIAN UNIVERSITY, Shaanxi (CN)

(72) Inventors: Guangming Shi, Shaanxi (CN); Lizhi Wang, Shaanxi (CN); Danhua Liu, Shaanxi (CN); Dahua Gao, Shaanxi (CN); Guo Li, Shaanxi (CN); Yang Liu, Shaanxi (CN)

(73) Assignee: Xidian University, Shaanxi (CN)

( * ) Notice: Subject to any disclaimer, the term of this patent is extended or adjusted under 35 U.S.C. 154(b) by 573 days.

(21) Appl. No.: 14/407,782

(22) PCT Filed: Jun. 9, 2013

(86) PCT No.: PCT/CN2013/077067
§ 371 (c)(1),
(2) Date: Dec. 12, 2014

(87) PCT Pub. No.: WO2013/185589
PCT Pub. Date: Dec. 19, 2013

(65) Prior Publication Data
US 2015/0153227 A1  Jun. 4, 2015

(30) Foreign Application Priority Data
Jun. 13, 2012 (CN) .......................... 2012 1 0193244

(51) Int. Cl.
G01J 3/04 (2006.01)
G01J 3/28 (2006.01)
(Continued)

(52) U.S. Cl.
CPC ............. *G01J 3/2823* (2013.01); *G01J 3/027* (2013.01); *H04N 5/2254* (2013.01); *H04N 5/23229* (2013.01); *G01J 2003/2826* (2013.01)

(58) Field of Classification Search
CPC .. G01J 3/2823; G01J 3/027; G01J 2003/2826; H04N 5/2254; H04N 5/23229
(Continued)

(56) References Cited

U.S. PATENT DOCUMENTS

| 2005/0162649 | A1 | 7/2005 | Kryszezynski |
| 2013/0194481 | A1* | 8/2013 | Golub .................... H04N 9/045 348/336 |

FOREIGN PATENT DOCUMENTS

| CN | 101349591 | 1/2009 |
| CN | 102706449 | 10/2012 |
| CN | 102706450 | 10/2012 |

OTHER PUBLICATIONS

International Search Report and Written Opinion for PCT/CN/2013077067 dated Sep. 19, 2013.

\* cited by examiner

*Primary Examiner* — Hina F Ayub
(74) *Attorney, Agent, or Firm* — Workman Nydegger

(57) ABSTRACT

A compressive sensing-based multispectral video imager comprises a beamsplitter, a first light channel, a second light channel, and an image reconstruction processor; the beamsplitter is configured to divide the beam of an underlying image into a first light beam and a second light beam; the first light beam enters the first light channel, processed and sampled in the first light channel, to obtain a first mixing spectral image which is transferred to the image reconstruction processor; the second light beam enters the second light channel, processed and sampled in the second light channel, to obtain a second mixing spectral image which is trans- (Continued)

ferred to the image reconstruction processor; the image reconstruction processor is configured to reconstruct the underlying spectral image based on the first mixing spectral image and the second mixing spectral image by using non-linear optimization method.

5 Claims, 6 Drawing Sheets

(51) Int. Cl.
    *H04N 5/225*     (2006.01)
    *H04N 5/232*     (2006.01)
    *G01J 3/02*     (2006.01)

(58) Field of Classification Search
    USPC .......................................................... 356/310
    See application file for complete search history.

(a) (b)

(a)

(b)

(c)

(d)

(e)

(f)

(a)   PSNR=32.7970dB (b)   PSNR=32.0331dB (c)   PSNR=31.4043dB (d)   PSNR=28.3981dB (e)   PRNR=28.7305dB (f)   PSNR=28.5167Db (a)  PSNR=35.5981dB (b)  PSNR=33.2748dB (c)  PSNR=31.0005dB (d)  PSNR=31.6604dB (e)  PSNR=31.0641dB (f)  PSNR=31.0641dB

COMPRESSIVE SENSING-BASED MULTISPECTRAL VIDEO IMAGER WITH DOUBLE CHANNELS AND IMAGING METHOD

CROSS-REFERENCE TO RELATED APPLICATIONS

The present invention is a 35 U.S.C. §371 U.S. National Stage Application corresponding to PCT Application No. PCT/CN2013/077067, filed on Jun. 9, 2013, which claims priority to Chinese Patent Application No. 201210193244.7, filed Jun. 13, 2012. The entire content of each of the aforementioned patent applications is incorporated herein by reference.

1. THE FIELD OF THE INVENTION

This invention relates to image processing in general, in particularly, to the collection of multispectral images, which is mainly applied to the capture and reconstruction of multispectral video and image information.

2. BACKGROUND AND RELEVANT ART

Early to 1960s when man-made satellites moved around the earth and captured images of the earth, an imaging technique became a useful tool to research the earth. In traditional imaging methods, people know that gray levels of grayscale images represent the difference of optics characteristics, which can be used to distinguish different materials. Based on the fact, the imaging technique is improved increasingly. Choosing filters having different colors to filter the image is good to the research about the fields of special agricultural crops, atmosphere, ocean and soil. This kind of imaging with discrete several colors (or several bands) is the so-called multispectral imaging, and a sequence of successive multispectral images form a multispectral video.

The multispectral video is a high dimension data, which is dramatically increased with the increasing of spatial resolution, spectral resolution and temporal resolution of spectral image. Facing the huge data amount of the multispectral video, to ensure high efficiency transmission and processing of the multispectral video, image compression, sampling and encoding with high-quality have already become a very crucial technique.

To realize high efficiency transmission and processing of the multispectral video data, traditional methods sample the multispectral image and then compress it, so that a great quantity of unimportant data is discarded. Such procedure of sampling and compression increases the system complexity, and under the requirement of high sampling rate, it is a difficult problem to implement A/D converter. Researcher focus on how to solve this problem, that is, sampling signal at the rate much lower than Nyquist sampling rate, and then reconstructing the signal fully.

In 2004, E. J. Candes, J. Romberg, T. Tao and D. L. Donoho proposed a new signal processing theory, i.e., compressive sensing, which brings a new idea to solve the above problem. The basis idea of the compressive sensing is to extract information as much as possible from data as less as possible, and has extremely huge prospect for application. The theory is an extension of traditional information theory, but exceeds traditional compression theory, and forms a new sub-branch. In its mathematical model, it is assumed that a signal X of length N contains sparse coefficients on some orthogonal basis or tight framework $\Psi$, and very little non-zero coefficients; if these coefficients are projected onto another observation set: $\Phi$:M*N, M<N, which is incoherent with $\Psi$, to obtain a set of observation data Y:M*1; thereby the signal X can be precisely recovered from the observation value Y through solving the optimization problem:

$$\tilde{X} = \min \|\Psi^T X\|_1 s \cdot t \Phi \Psi^T X = Y$$

Since X is sparse in the transform domain $\Psi$, by solving the above norm optimization problem, the recovery value $\tilde{X}$ can be obtained to well approximate the underlying signal X.

Since multispectral image signals have compressibility, once finding a proper sparse representation domain, the high-dimension signal obtained by transformation can be projected onto a low-dimension space by making use of an observation matrix which is incoherent with the transformation basis, to perform compression and sampling efficiently; thereby the requirement of the camera resolution can be reduced under a certain spectral resolution, or the multispectral resolution can be greatly increased under the same condition. Further, through solving the optimization problem, the underlying signal can be reconstructed from the less projections with higher probability. It can be proved that the projection information contains enough information to reconstruct the underlying signal. In general, a random observation matrix provides good observation result because the random matrix almost is incoherent with all transformation base matrixes.

Currently, the compressive sensing theory is often used for low rate sampling and reconstruction of single image. However, the multispectral imaging has characteristics of wide frequency spectrum, huge data quantity and high correlation between all bands, which make it suitable to apply the compressive sensing theory on low rate information sampling and reconstruction of multispectral images.

In traditional multispectral video imagers with tunable filters, the filters are successively changed for imaging one scene respectively, to obtain multiple spectral images. The traditional multispectral video imagers have many disadvantages due to restrictions of their imaging concepts.

Traditional multispectral video imagers employ the structure of tunable mechanism, which brings vibration of the imagers, and results in low imaging quality and poor stabilization.

Traditional multispectral imagers need to change the filter once for imaging each spectrum section image, which results in low imaging efficiency and low signal to noise ratio, and difficulty for producing good performance filters.

Traditional multispectral imaging methods employ the manner of compression following sampling, which results in great waste of spectral data and compression distortion.

SUMMARY OF THE INVENTION

The present invention aims at the above disadvantages in prior arts, and proposes a compressive sensing-based multispectral video imager with double channels and imaging method, to realize fully collection of multispectral video image data and increase the imaging efficiency, stabilization, and image quality of the multispectral video imager, and reduce the complexity and production difficulty of the imager.

The present invention is based on the principle that by using CASSI (Spectral Image Estimation for Coded aperture Snapshot Spectral Imagers) proposed by Ashwin A. Wagadarikar et al. for reference, a double-channel technique is proposed based on existing single channel technique, and the whole system is divided into a data observation part and a spectral image reconstruction part; the data observation part comprises two light channels; a splitter divides the spectral image into two portions which then enter two light channels respectively; and the data sampling is performed respectively; since the randomly coded apertures in the two light channels are complementary, the observed data contains full information about the spectral image; and the spectral image reconstruction part receives the data collected by the data observation part and reconstructs the underlying spectral images with higher accuracy through solving non-linear optimization problem.

Based on the above theory, the present invention provides a compressive sensing-based multispectral video imager using double channels, comprising: a beamsplitter (1), a first light channel (2), a second light channel (3) and an image reconstruction processor (4);

the beamsplitter (1) is configured to divide the beam of an underlying image (X) into a first light beam and a second light beam; the first light beam enters the first light channel (2), and is processed and sampled in the first light channel, then a first mixing spectral image ($X_1$) is obtained, and is transferred to the image reconstruction processor (4);

the second light beam enters the second light channel (3), and is processed and sampled in the second light channel, then a second mixing spectral image ($X_2$) is obtained and transferred to the image reconstruction processor (4); and the image reconstruction processor (4) is configured to reconstruct the underlying spectral image (X) based on the first mixing spectral image ($X_1$) and the second mixing spectral image ($X_2$) by making use of non-linear optimization method.

In an embodiment of the present invention, the first light channel (2) comprises a first objective lens (21), a first coded aperture (22), a first bandpass filter (23), a first relay lens set (24), a first prism set (25) and a first sensor array (26) which are sequentially arranged;

the second light channel (3) comprises a second objective lens (31), a second coded aperture (32), a second bandpass filter (33), a second relay lens set (34), a second prism set (35) and a second sensor array (36) which are sequentially arranged;

the first light beam entering the first light channel (2) is focused and imaged on the first objective lens (21), the first coded aperture (22) performs random coding for beams on positions of a spectral image; beams of the coded spectral image are filtered by the first bandpass filter (23), then are relayed by the first relay lens set (24) to the first prism set (25) to produce dispersion; and beams of the dispersed spectral imagers are sensed by the first sensor array (26), to obtain the first mixing spectral image ($X_1$);

the second light beam is focused and imaged on the second objective lens (31), the second coded aperture (32) performs random coding for beams on positions of a spectral image; beams of the coded spectral image are filtered by the second bandpass filter (33), then are relayed by the second relay lens set (34) to the second prism set (35) to produce dispersion; and beams of the dispersed spectral image are sensed by the second sensor array (36), to obtain the second mixing spectral image ($X_2$).

In an embodiment of the present invention, each of the first coded aperture (22) and the second coded aperture (32) is a rectangle plate having transparent and opaque blocks of same size; the transparent block represents code 1 and the opaque block represents code 0; the code of each block of the first coded aperture (22) is randomly designated; the code of each block of the second coded aperture (32) is opposite to that of the block of same position of the first coded aperture (22), to realize complementary coding of image information of each position of the spectral image and ensure the completeness of spectral image information sampling.

The present invention further provides a compressive sensing-based multispectral video imaging method using double channels, comprising the following steps:

(S1) dividing a light beam of a underlying spectral image into a first light beam and a second light beam; wherein the first light beam and the second light beam enter a first light channel and a second light channel respectively;

(S2) obtaining a first mixing spectral image ($X_1$) by the following steps:

(S2a) focusing and imaging the first light beam in the first light channel to obtain a spectral image;

(S2b) randomly coding the spectral image, comprising random blocking the light beam at each position of the spectral image; wherein the blocked position presents code 0, and the non-blocked position presents code 1;

(S2c) filtering the coded spectral image, to filter out a light beam of the spectral image outside the bandwidth to be reconstructed;

(S2d) shifting images of spectral dimensions of the spectral image in the direction of spatial dimension, to disperse the light beam of the spectral image and to change relative positions between all images of spectral dimension;

(S2e) obtaining, by a sensor array, the light quantity of light beam at each position of the shifted spectral image, to obtain the first mixing spectral image ($X_1$);

(S3) obtaining a second mixing spectral image ($X_2$) by the following steps:

(S3a) focusing and imaging the second light beam in the second light channel to obtain a spectral image;

(S3b) complementarily to the spectral image in the first light channel, coding the spectral image in the second light channel, comprising correspondingly blocking the light beam at each position of the spectral image in the second light channel, so that the blocking state of each position is complementary to that of the same position of the spectral image in the first light channel;

(S3c) filtering the light beam of the coded spectral image, to filter out a light beam outside the bandwidth to be reconstructed;

(S3d) shifting images of spectral dimensions of the spectral image in the direction of spatial dimension, to disperse the light beam of the spectral image and to change relative positions between all images of spectral dimension;

(S3e) obtaining, by a sensor array, the light quantity of light beam at each position of the shifted spectral image, to obtain the second mixing spectral image ($X_2$);

(S4) based on the first mixing spectral image ($X_1$) and the second mixing spectral image ($X_2$), reconstructing the underlying spectral image (X) by using non-linear optimization method; and (S5) repeatedly imaging the same one scene by repeating the steps (S1) to (S4), to obtain spectral images of the scene at different times, and to form the multispectral video.

The shifting steps (S2d) and (S3d) may comprise: arranging a prism set on a transmission path of the light beam of the spectral image, so that light beams of different spectral dimension images pass the prism set to produce shifts of different distances, and relative positions between the images of spectral dimension are changed.

The present invention has the following advantages over traditional techniques.

First, the present invention aims at the disadvantage of low imaging efficiency of traditional multispectral video imagers to propose an imaging method based on compressive sensing. The method employs double channel observation technology, and can perform fully sampling of spectral images. Every exposure can image multiple bands with high temporal resolution and high signal to noise ratio.

Second, the present invention aims at the disadvantage of vibration of traditional multispectral video imager including tunable mechanism and poor imaging quality, to propose a multispectral video imager containing no tuning mechanism, which ensures imaging stabilization and imaging quality of the multispectral video imager.

Third, the present invention aims at the disadvantage of the traditional multispectral video imager, which samples information with high density sensor array and then compresses it with loss of a part of redundant information, to propose samples information with low density sensor array, so as to realize the integration of sampling and compression, increase utilization ratio of the sensor array, reduces the production difficulty and complexity of the system, and avoid compression distortion.

DETAILED DESCRIPTION OF EMBODIMENTS

Figure 1:
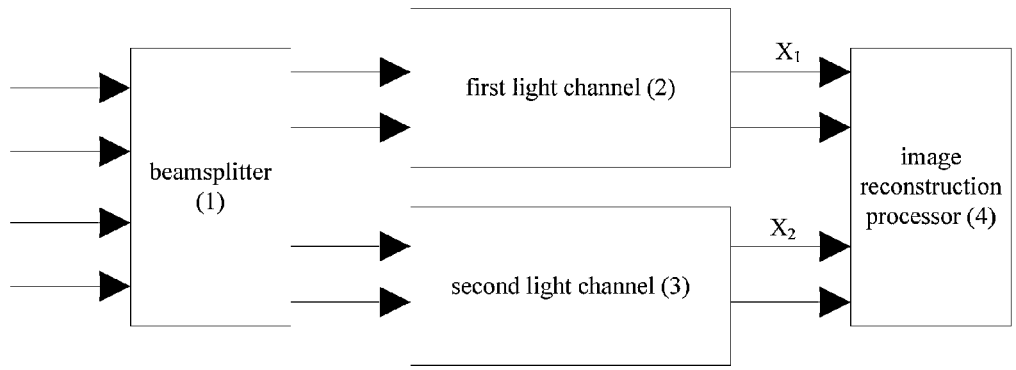
FIG. 1 show the structure block diagram of the multispectral video imager according to an embodiment of the present invention.
Figure 2:
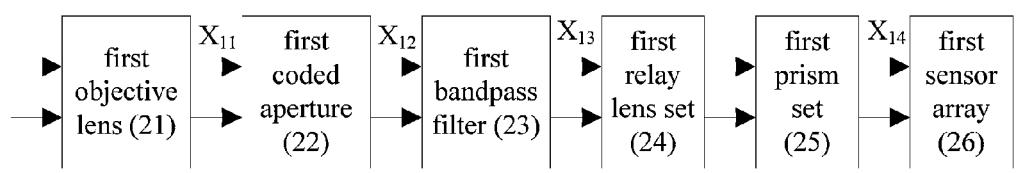
FIG. 2 shows the structure block diagram of the first light channel in the imager according to an embodiment of the present invention.
Figure 3:
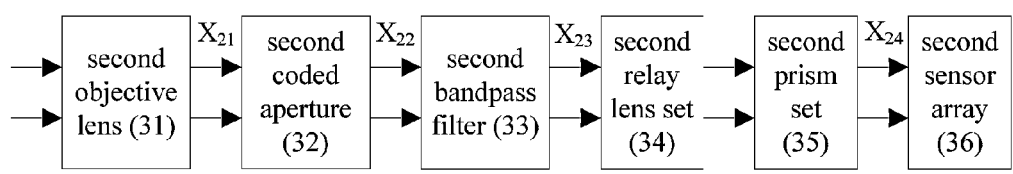
FIG. 3 shows the structure block diagram of the second light channel in the imager according to an embodiment of the present invention.

As shown in FIG. 1, an embodiment of the present invention provides a compressive sensing-based multispectral video imager with double channels, comprising: a beamsplitter (1), a first light channel (2), a second light channel (3) and an image reconstruction processor (4). FIG. 2 and FIG. 3 show structures of the first light channel (2) and the second light channel (3) respectively. The beam of the underlying image is divided, by the beamsplitter (1), into two light beams, which contain the same spectral information and enter two light channels at different directions. The first beam and the second beam are processed and sampled in the first light channel (2) and the second light channel (3), respectively, by various parts, to obtain a first mixing spectral image ($X_1$) and a second mixing spectral image ($X_2$); then the two mixing spectral images are transferred to the image reconstruction processor (4). The image reconstruction processor (4) reconstructs the underlying spectral image (X) based on the first mixing spectral image ($X_1$) and the second mixing spectral image ($X_2$) by making use of non-linear optimization method.

Figure 4:
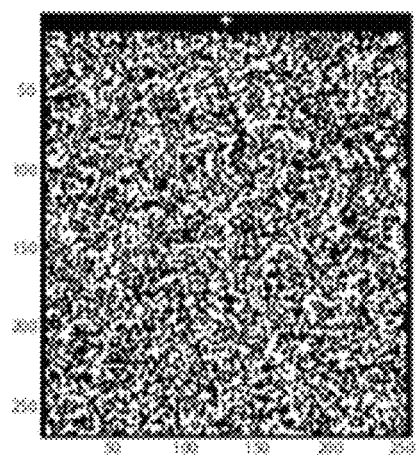
FIG. 4 shows the coded aperture in the imager according to an embodiment of the present invention.
Figure 4:
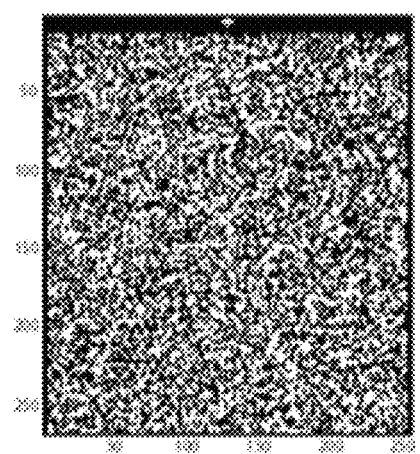

As shown in FIG. 2, the first light channel (2) of the embodiment comprises a first objective lens (21), a first coded aperture (22), a first bandpass filter (23), a first relay lens set (24), a first prism set (25) and a first sensor array (26) which are sequentially arranged. The first objective lens (21) is located at the front end of the first light channel (2), and is configured to focus the light beam in the first light channel (2), to form a clear spectral image. The first coded aperture (22) is located in the image plane of the first objective lens (21). As shown in FIG. 4(a), the first coded aperture (22) is a rectangle plate having transparent and opaque blocks; and sizes of the blocks are the same. The white block is transparent and represents code "1"; and the black block is opaque and represents code "0". The coding of each block is set randomly to ensure randomly coding of the spectral image information. The first bandpass filter (23) is located at the rear end of the first coded aperture (22), and comprises a set of lenses for filtering out an unnecessary beam of spectral dimension image. The first relay lens set (24) is located behind the first bandpass filter (23), and is configured to relay the beam of spectral dimension image to the first prism set (25) which is remained by the first bandpass filter (23). The first prism set (25) is located between the first relay lens set (24) and the first sensor array (26), and reveals different refraction ratios to different spectral dimension images, so that the spectral dimension images produce shifting of different distances when reaching the first sensor array (26) through the first prism set (25), to realize the shifting of different spectral dimension images. The first sensor array (26) is located at the rear end of the first light channel (2), obtains light quantity information of the beam at each position of the spectral image, and converts the information into digital form, i.e. the first mixing spectral image ($X_1$).

As shown in FIG. 3, the second light channel (3) of the embodiment comprises a second objective lens (31), a second coded aperture (32), a second bandpass filter (33), a second relay lens set (34), a second prism set (35) and a second sensor array (36) which are sequentially arranged. The second objective lens (31) is at the front end of the second light channel (3), and is configured to focus the light beam in the second light channel (3) to form a clear spectral image. The second coded aperture (32) is located in the image plane of the second objective lens. As shown in FIG. 4(b), similarly to the first coded aperture (22), the second coded aperture (32) is a rectangle plate containing transparent and opaque blocks of same size. The white block is transparent and represents code "1"; and the black block is opaque and represents code "0". The code of every block of the second coded aperture (32) is not set randomly, and is complementary with the code of the block at the same position on the first coded aperture (22), so that the first coded aperture (22) and the second coded aperture (32) realize complementarily coding of spectral image information and ensure observation integrality of spectral image information. The second bandpass filter (33) is located at the rear end of the second coded aperture (32), and comprises a set of lens for filtering out an unnecessary beam of spectral dimension image. The second relay lens set (34) is located behind the second bandpass filter (33) and relays the beam of spectral dimension image remained by the second bandpass filter (33) to the second prism set (35). The second prism set (35) is located between the second relay lens set (34) and the second sensor array (36), and reveals different refraction ratios to different spectral dimension images, so that the spectral dimension images produce shifting of different distances when reaching the second sensor array (36), to realize the shifting of different spectral dimension images. The second sensor array (36) is located at the rear end of the second light channel (3), obtains the light quantity information of beam at each position on the spectral image and converts the information into digital form, i.e. the second mixing spectral image ($X_2$).

Figure 5:
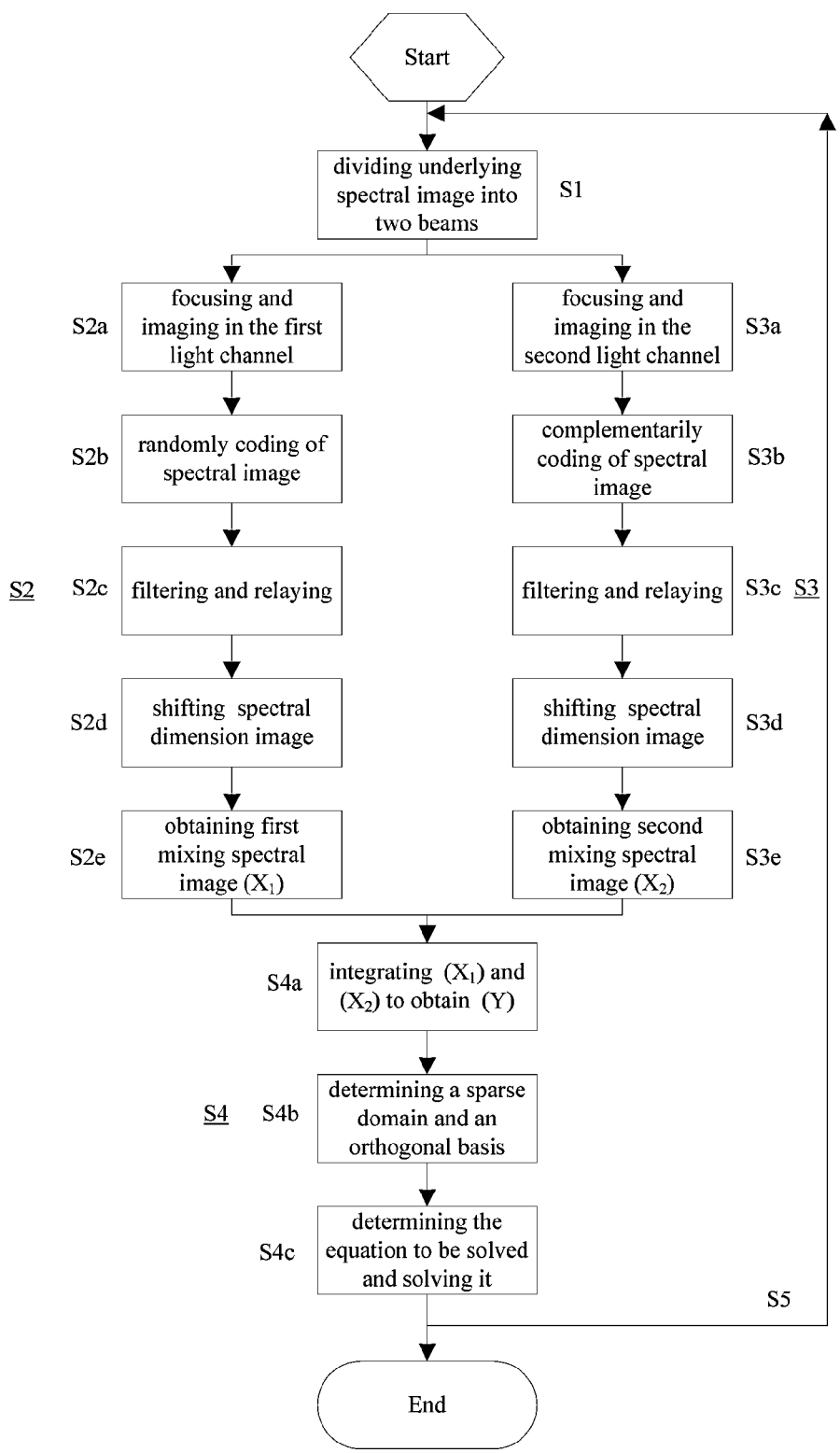
FIG. 5 shows the flowchart of a compressive sensing-based multispectral video imaging method according to an embodiment of the present invention.

In the embodiment shown in FIG. 5, a compressive sensing-based multispectral video imaging method using double channels comprises the following steps:

(Step 1) dividing the light beam of the underlying spectral image into two light beams containing the same spectral image information, i.e., first beam and second beam; the two light beams enter two light channels in two different directions respectively, i.e. a first light channel and a second light channel.

(Step 2) obtaining a mixing spectral image of the first light channel, which comprises the following steps:

(S2a) focusing and imaging the first beam in the first light channel, to obtain an initial spectral image ($X_{11}$) of the first light channel;

(S2b) randomly coding information at each position of the initial spectral image ($X_{11}$), comprising: random blocking the beam at each position of the spectral image ($X_{11}$) by using a shading plate. The beam cannot pass the blocked position, and can pass the non-blocked position through a quadrate aperture. The blocked position is coded as "0" and the non-blocked position is coded as "1", so as to obtain the coded spectral image of the first light channel.

(S2c) filtering the coded spectral image of the first light channel, to filter out an unnecessary beam of spectral dimension image outside the reconstruction bandwidth and maintain the beam of the spectral dimension image within the bandwidth, to obtain the filtered spectral image ($X_{13}$) of the first light channel.

(S2d) locating a prism set on the routine of the beam of the filtered spectral image ($X_{13}$) of the first light channel to disperse the beam of the filtered spectral image. The spectral dimension images shift different distances along spatial dimension, to obtain the shifted spectral image ($X_{14}$) of the first light channel.

(S2e) capturing, by a sensor array, light quantity information of the shifted spectral image ($X_{14}$) of the first light channel; the light quantity information captured at each position of the sensor array is sum of the light information at the same position of all shifted spectral dimension images of the spectral image ($X_{14}$), so as to realize the information mixing of different spectral dimension images; the summed light quantity information is converted into digital form to obtain a mixing spectral image ($X_1$) of the first light channel;

(Step 3) obtaining a mixing spectral image of the second light channel, which comprise the following steps:

(S3a) focusing and imaging the second beam in the second light channel, to obtain an initial spectral image ($X_{21}$) of the second light channel;

(S3b) complementarily to the spectral image in the first light channel, coding the initial spectral image ($X_{21}$) of the second light channel, comprising: correspondingly blocking the beam at each position of the spectral image ($X_{21}$) in the second light channel, so that the blocking state of each position is contrary to that of the same position of the spectral image ($X_{11}$) in the first light channel, to ensure that information at any position of the underlying spectral image (X) is not missed, thereby obtaining the complementarily coded spectral image ($X_{22}$) of the second light channel.

(S3c) filtering the beam of the complementarily coded spectral image ($X_{22}$) of the second light channel, to filter out an unnecessary beam of the spectral dimension image which is outside the reconstruction bandwidth, and maintain the beam of the spectral dimension image within the bandwidth, thereby obtaining the filtered spectral image ($X_{23}$) of the second light channel.

(S3d) locating a prism set at the routine of the beam of the filtered spectral image ($X_{23}$) of the second light channel, to disperse the beam of the spectral image ($X_{23}$). The spectral dimension images shift different distances along spatial dimension, to obtain the shifted spectral image ($X_{24}$) of the second light channel.

(S3e) capturing, by a sensor array, light quantity information of the shifted spectral image ($X_{24}$) of the second light channel; the light quantity information captured at each position of the sensor array is sum of the light information at the same position of all shifted spectral dimension images of the spectral image ($X_{24}$), so as to realize the information mixing of different spectral dimension images; the summed light quantity information is converted into digital form to obtain a mixing spectral image ($X_2$) of the second light channel;

(Step 4) based on the first mixing spectral image ($X_1$) and the second mixing spectral image ($X_2$), reconstructing the underlying spectral image (X) by using non-linear optimization method. The Step 4 comprises the following steps:

(S4a) connecting the input first mixing spectral image ($X_1$) with the second mixing spectral image ($X_2$) on the spatial plane, to obtain a general mixing spectral image Y:

$$Y=[X_1, X_2]=[A_1X, A_2X]=AX$$

where, $A_1$ and $A_2$ are two linear operators, $A_1X$ and $A_2X$ represent results obtained by the first light channel and the second light channel operating on the spectral image (X), respectively; $A=[A_1, A_2]$ represents linear function operators of whole observation part, and AX represents the result obtained by the whole observation part operating on the spectral images;

(S4b) assuming that $\Psi$ is an orthogonal basis of the underlying spectral image (X) in a sparse domain, and the representing coefficient $\Phi$ of the underlying spectral image (X) on the basis $\Psi$ is sparse, that is, the representing coefficient $\Phi$ contains many zero elements or those less than a preset threshold:

$$\Phi=\Psi^{-1}X=\Psi^T X$$

where, $\Psi^{-1}$ and $\Psi^T$ represent the inverse and transposition of the matrix of the orthogonal basis $\Psi$, respectively.

(S4c) assuming min $\|\Psi^T X\|_0$ that is an objective function of optimization solution and Y=AX is a constraint condition, and solving the following equation by using non-linear optimization method, such as basis pursuit algorithm, two-step iteration algorithm or greedy algorithm, to obtain the approximate value $\tilde{X}$ of the underlying spectral image (X):

$$\tilde{X}=\arg\min\|\Psi^T X\|_0 \, s \cdot t \, Y=AX$$

where $\|\Psi^T X\|_0$ represents the norm $l_0$ of the representing coefficient $\Phi$ of the underlying spectral image X on sparsity domain, arg min represents taking minimal value; and s·t Y=AX represents that the constraint condition is Y=AX;

(Step 5) repeating the above stated steps for the same one scene, i.e., performing multiple steps of multiplespectral imaging the scene at different times, to form a multispectral video.

Figure 6:
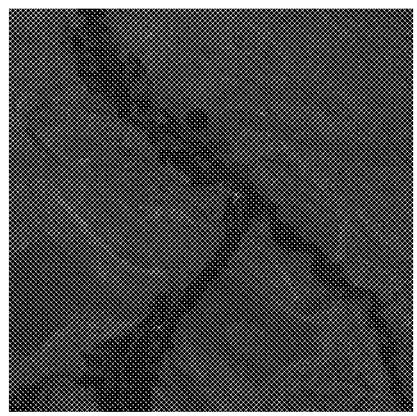
FIGS. 6(a)-6(f) show spectral dimension image planes of multispectral images of a river as originally captured which are used in the simulation scheme.
Figure 6:
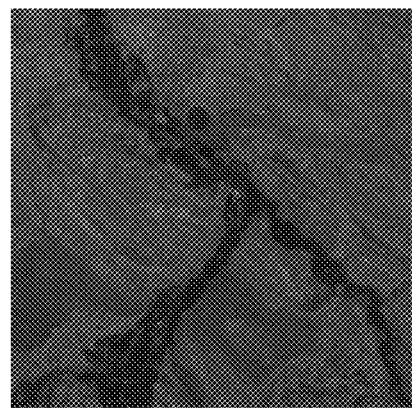
Figure 6:
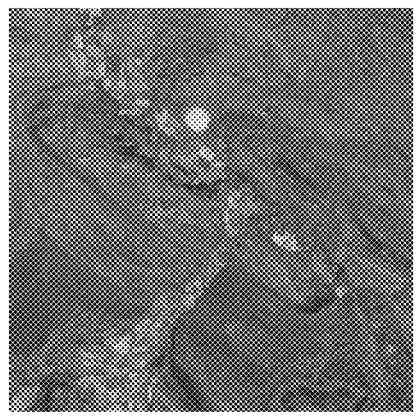
Figure 6:
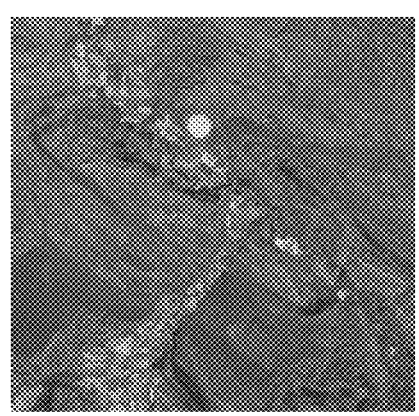
Figure 6:
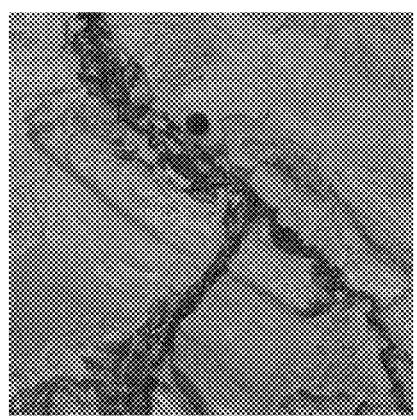
Figure 6:
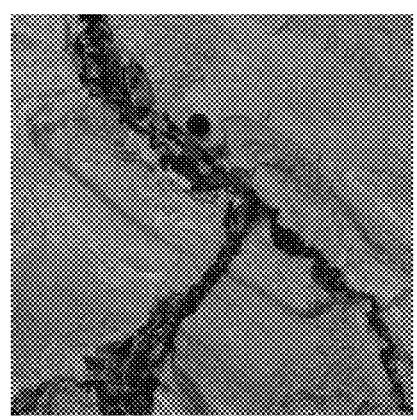
Figure 7:
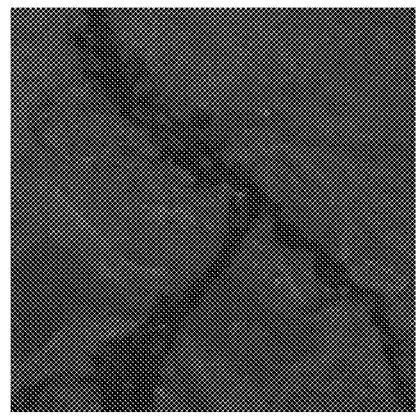
FIGS. 7(a)-7(f) show multispectral images reconstructed by using single channel and corresponding PSNR values of spectral dimension images.
Figure 7:
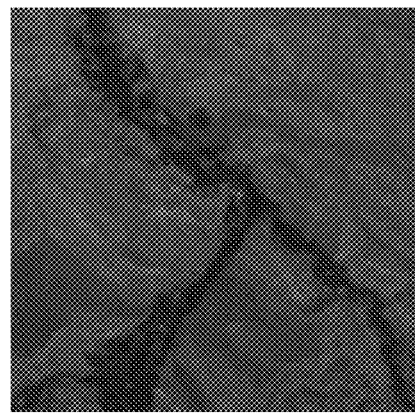
Figure 7:
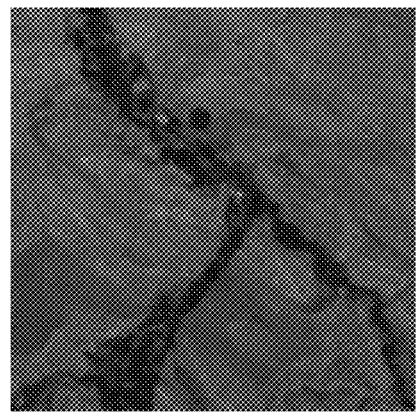
Figure 7:
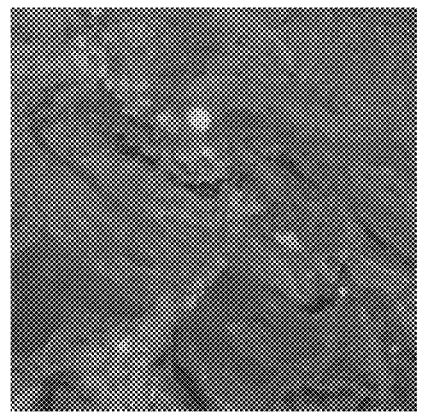
Figure 7:
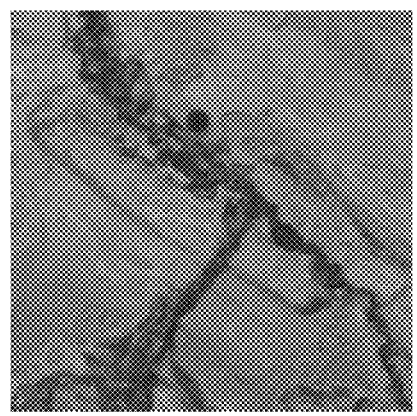
Figure 7:
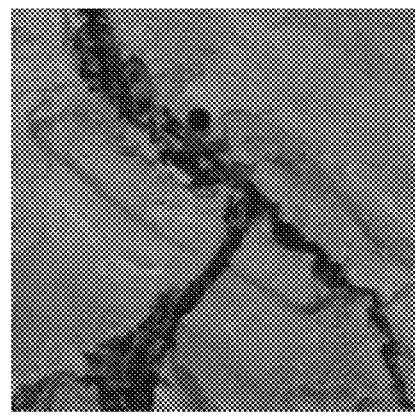

To verify the feasibility and validity of the embodiments of the present invention, an instance is simulated by using MATLAB simulation software, and the procedure of one spectral imaging is as following:

Simulation 1:

(a) a multispectral image of a river that is originally captured is selected as a underlying spectral image, which contain 6 spectral bands; and each spectral band contains 512*512 pixels, as shown in FIG. 6;

(b) according to the structure of existing single channel spectral imager, the cosine sparse domain and two-step iteration algorithm are utilized to reconstruct the underlying spectral image and calculate the PSNR value of reconstruction result of each spectral dimension image, as shown in FIG. 7; where FIGS. 7(a), 7(b), 7(c), 7(d), 7(e) and 7(f) show reconstruction results and corresponding PSNRs of multispectral images shown in FIGS. 6(a), 6(b), 6(c), 6(d), 6(e) and 6(f), respectively.

Figure 8:
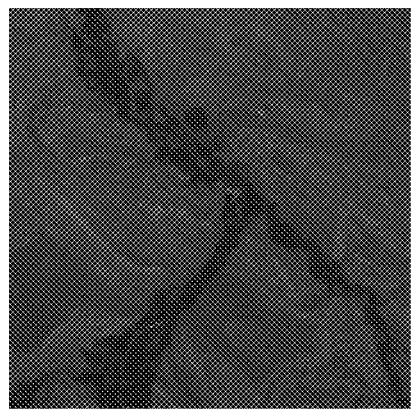
FIGS. 8(a)-8(f) show multispectral images reconstructed by using double channels and corresponding PSNR values of spectral dimension images.
Figure 8:
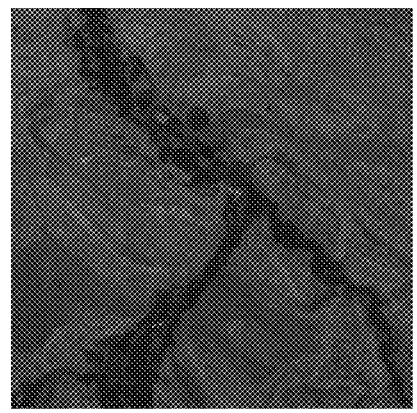
Figure 8:
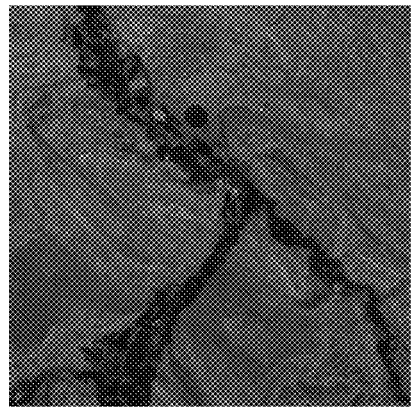
Figure 8:
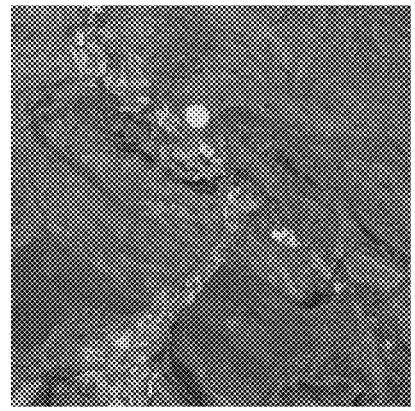
Figure 8:
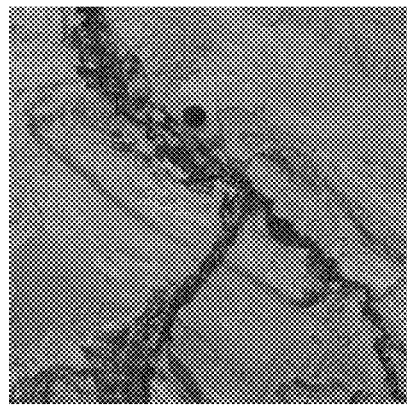
Figure 8:
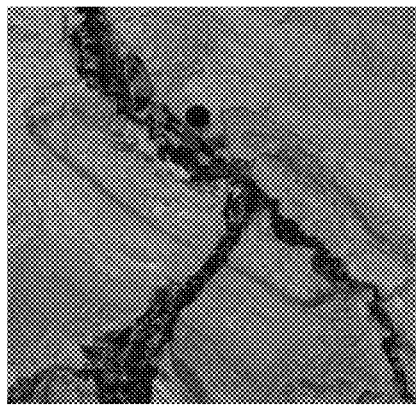

Simulation 2:

(a) a multispectral image of a river that is originally captured is selected as a underlying spectral image, which contain 6 spectral dimension images each of which contains 512*512 pixels, as shown in FIG. 6;

(b) according to the structure of the double channel spectral imager of the embodiments of the present invention, the cosine sparse domain and two-step iteration algorithm are utilized to reconstruct the underlying spectral image and calculate the PSNR value of reconstruction result of each spectral dimension image, as shown in FIG. 8, where FIGS. 8(a), 8(b), 8(c), 8(d), 8(e) and 8(f) show reconstruction results and PSNRs of multispectral images shown in FIGS. 6(a), 6(b), 6(c), 6(d), 6(e) and 6(f), respectively.

From the result of Simulation 1, it can be seen that over the range of the six spectral dimension images reconstructed by using single channel, the average PSNR value is 30.31 dB, the minimal PSNR value is 28.5167 dB, and the maximal PSNR value is 32.7970 dB.

From the result of Simulation 2, it can be seen that over the range of the six spectral dimension images reconstructed by using double channels according to the embodiments of the present invention, the average PSNR value is 32.82 dB, the minimal PSNR value is 31.0005 dB, and the maximal PSNR value is 35.5981 dB.

By comparing the result of Simulation 1 with that of Simulation 2, it can be seen that with respect to the prior art using single channel, the present invention using double channels can increase the average PSNR value by 2.51 dB, which demonstrates that the present invention can provide the better performance in multispectral image reconstruction.

We claim:

1. A compressive sensing-based multispectral video imager with double channels, comprising:
a beamsplitter, a first light channel, a second light channel, and an image reconstruction processor, wherein:
the beamsplitter is configured to divide the light beam of an underlying image into a first light beam and a second light beam; wherein the first light beam enters the first light channel, and the second light beam enters the second light channel;
the first light channel is configured to process and sample the first light beam to obtain a first mixing spectral image, and transfer it to the image reconstruction processor;
the second light channel is configured to process and sample the second light beam to obtain a second mixing spectral image, and transfer it to the image reconstruction processor; and
the image reconstruction processor is configured to reconstruct the underlying spectral image based on the first mixing spectral image and the second mixing spectral image by making use of non-linear optimization method, wherein:
the first light channel comprises a first objective lens, a first coded aperture, a first bandpass filter, a first relay lens set, a first prism set, and a first sensor array which are sequentially arranged;
the second light channel comprises a second objective lens, a second coded aperture, a second bandpass filter, a second relay lens set, a second prism set, and a second sensor array which are sequentially arranged;
the first light beam entering the first light channel is focused and imaged on the first objective lens, the first coded aperture performs random coding for beams on positions of a spectral image; beams of the coded spectral image are filtered by the first bandpass filter, then are relayed by the first relay lens set to the first prism set to produce dispersion; and beams of the dispersed spectral image are sensed by the first sensor array to obtain the first mixing spectral image; and
the second light beam is focused and imaged on the second objective lens, the second coded aperture performs random coding for beams on positions of a spectral image; beams of the coded spectral image are filtered by the second bandpass filter, then are relayed by the second relay lens set to the second prism set to produce dispersion; and beams of the dispersed spectral image are sensed by the second sensor array to obtain the second mixing spectral image.

2. The imager of claim 1, wherein:
each of the first coded aperture and the second coded aperture is a rectangle plate having transparent and opaque blocks of same size;
the transparent block represents code 1 and the opaque block represents code 0;
the code of each block of the first coded aperture is randomly designated;
the code of each block of the second coded aperture is opposite to that of the block of same position of the first coded aperture, to realize complementary coding of image information of each position of the spectral image and ensure the completeness of spectral image information sampling.

3. A compressive sensing-based multispectral video imaging method using double channels, comprising the following steps:

(S1) dividing a light beam of a underlying spectral image into a first light beam and a second light beam; wherein the first light beam and the second light beam enter a first light channel and a second light channel respectively;

(S2) obtaining a first mixing spectral image ($X_1$) by the following steps:

(S2a) focusing and imaging the first light beam in the first light channel to obtain a spectral image;

(S2b) randomly coding the spectral image, comprising random blocking the light beam at each position of the spectral image; wherein the blocked position presents code 0, and the non-blocked position presents code 1;

(S2c) filtering the coded spectral image, to filter out a light beam of the spectral image outside the bandwidth to be reconstructed;

(S2d) shifting images of spectral dimensions of the spectral image in the direction of spatial dimension, to disperse the light beam of the spectral image and to change relative positions between all images of spectral dimension;

(S2e) obtaining, by a sensor array, the light quantity of light beam at each position of the shifted spectral image, to obtain the first mixing spectral image ($X_1$);

(S3) obtaining a second mixing spectral image ($X_2$) by the following steps:

(S3a) focusing and imaging the second light beam in the second light channel to obtain a spectral image;

(S3b) complementarily to the spectral image in the first light channel, coding the spectral image in the second light channel, comprising correspondingly blocking the light beam at each position of the spectral image in the second light channel, so that the blocking state of each position is complementary to that of the same position of the spectral image in the first light channel;

(S3c) filtering the light beam of the coded spectral image, to filter out a light beam outside the bandwidth to be reconstructed;

(S3d) shifting images of spectral dimensions of the spectral image in the direction of spatial dimension, to disperse the light beam of the spectral image and to change relative positions between all images of spectral dimension;

(S3e) obtaining, by a sensor array, the light quantity of light beam at each position of the shifted spectral image, to obtain the second mixing spectral image ($X_2$);

(S4) based on the first mixing spectral image ($X_1$) and the second mixing spectral image ($X_2$), reconstructing the underlying spectral image (X) by using non-linear optimization method; and (S5) repeatedly imaging the same one scene by repeating the steps (S1) to (S4), to obtain multiple spectral images of the scene at different times, and to form the multispectral video.

4. The imaging method of claim 3, wherein the shifting steps (S2d) and (S3d) comprise:

arranging a prism set on a transmission path of the light beam of the spectral image, so that light beams of different spectral dimension images pass the prism set to produce shifts of different distances, and relative positions between the images of spectral dimension are changed.

5. The imaging method of claim 3, wherein the reconstructing step comprises the following steps:

(S4a) integrating the first mixing spectral image ($X_1$) and the second mixing spectral image ($X_2$) on the spatial plane, to obtain a general mixing spectral image (Y):

$$Y=[X_1, X_2]=[A_1 X, A_2 X]=AX$$

where, $A_1$ and $A_2$ are two linear operators, $A_1 X$ and $A_2 X$ represent results obtained by the first light channel and the second light channel operating on the spectral image (X), respectively; $A=[A_1, A_2]$ represents linear function operators of whole observation part, and AX represents the result obtained by the whole observation part operating on the spectral images;

(S4b) assuming that $\Psi$ is an orthogonal basis of the underlying spectral image (X) in a sparse domain, and the representing coefficient $\Phi$ of the underlying spectral image (X) on the basis $\Psi$ is sparse, i.e., $\Phi=\Psi^T X=\Psi^{-1} X$;

(S4c) assuming that $\min \|\Psi^T X\|_0$ is an objective function of optimization solution and Y=AX is a constraint condition, solving the following equation by using non-linear optimization method, to obtain the approximate value $\tilde{X}$ of the underlying spectral image (X):

$$\tilde{X}=\arg \min \|\Psi^T X\|_0 \, s \cdot t \, Y=AX$$

where $\|\Psi^T X\|_0$ represents the norm $l_0$ of the representing coefficient $\Phi$ of the underlying spectral image X on sparsity domain, arg min represents taking minimal value; and s·t Y=AX represents that the constraint condition is Y=AX.

* * * * *